US010770208B2

(12) United States Patent
Horiuchi et al.

(10) Patent No.: US 10,770,208 B2
(45) Date of Patent: Sep. 8, 2020

(54) PERMANENT MAGNET, MOTOR, AND GENERATOR

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Keiko Okamoto, Kanagawa (JP); Masaya Hagiwara, Kanagawa (JP); Tsuyoshi Kobayashi, Kanagawa (JP); Masaki Endo, Tokyo (JP); Tadahiko Kobayashi, Kanagawa (JP); Naoyuki Sanada, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 130 days.

(21) Appl. No.: 14/661,122

(22) Filed: Mar. 18, 2015

(65) Prior Publication Data
US 2015/0270040 A1 Sep. 24, 2015

Related U.S. Application Data

(63) Continuation of application No. PCT/JP2014/001556, filed on Mar. 18, 2014.

(51) Int. Cl.
*H01F 1/055* (2006.01)
*C22C 1/04* (2006.01)
(Continued)

(52) U.S. Cl.
CPC .......... *H01F 1/055* (2013.01); *C22C 1/0441* (2013.01); *C22C 19/07* (2013.01); *C22C 30/02* (2013.01);
(Continued)

(58) Field of Classification Search
None
See application file for complete search history.

(56) References Cited

U.S. PATENT DOCUMENTS 4,746,378 A 5/1988 Wysiekierski et al.
8,179,068 B2 5/2012 Yuuki et al.
(Continued)

FOREIGN PATENT DOCUMENTS

CA 1237965 6/1988
CN 102209796 10/2011
(Continued)

OTHER PUBLICATIONS

Liu et al. (IEEE Transactions on Magnetics, 1989, vol. 25, No. 5, p. 3785-3787).*
(Continued)

*Primary Examiner* — Xiaowei Su
(74) *Attorney, Agent, or Firm* — Amin, Turocy & Watson, LLP

(57) ABSTRACT

A high performance permanent magnet is provided. The permanent magnet includes a composition represented by a composition formula: $R_p Fe_q M_r Cu_t Co_{100-p-q-r-t}$, and a metallic structure including cell phases having a $Th_2Zn_{17}$ crystal phase and Cu-rich phases having higher Cu concentration than the cell phases. An average diameter of the cell phases is 220 nm or less, and in a numeric value range from a minimum diameter to a maximum diameter of the cell phases, a ratio of a number of cell phases having a diameter in a numeric value range of less than upper 20% from the maximum diameter is 20% or less of all the cell phases.

13 Claims, 3 Drawing Sheets

(51) Int. Cl.

| | | |
|---|---|---|
| *C22C 19/07* | (2006.01) | |
| *C22C 30/02* | (2006.01) | |
| *H02K 1/02* | (2006.01) | |
| *B22F 9/08* | (2006.01) | |
| *B22F 9/04* | (2006.01) | |
| *H01F 7/02* | (2006.01) | |

(52) U.S. Cl.
CPC ......... *H01F 1/0551* (2013.01); *H01F 1/0557* (2013.01); *H02K 1/02* (2013.01); *B22F 9/08* (2013.01); *B22F 2009/041* (2013.01); *B22F 2009/043* (2013.01); *B22F 2009/044* (2013.01); *B22F 2009/048* (2013.01); *B22F 2998/10* (2013.01); *B22F 2999/00* (2013.01); *H01F 7/0226* (2013.01)

(56) References Cited

U.S. PATENT DOCUMENTS

| | | |
|---|---|---|
| 8,552,678 B2 | 10/2013 | Yuuki et al. |
| 8,884,576 B2 | 11/2014 | Yuuki et al. |
| 2011/0278976 A1* | 11/2011 | Horiuchi ................. C22C 19/07 310/152 |
| 2012/0146444 A1 | 6/2012 | Horiuchi et al. |
| 2013/0082559 A1 | 3/2013 | Hagiwara et al. |
| 2013/0241682 A1 | 9/2013 | Horiuchi et al. |
| 2014/0184133 A1 | 7/2014 | Yuuki et al. |

FOREIGN PATENT DOCUMENTS

| | | |
|---|---|---|
| CN | 102474165 | 5/2012 |
| EP | 0156482 | 10/1985 |
| EP | 0156483 | 10/1985 |
| JP | 58-139406 | 2/1983 |
| JP | 60-238463 | 11/1985 |
| JP | 61-114506 | 6/1986 |
| JP | 5-198412 | 8/1993 |
| JP | 10-070023 | 3/1998 |
| JP | 2008-029148 | 2/2008 |
| JP | 2008-043172 | 2/2008 |
| JP | 2010-121167 | 6/2010 |
| JP | 2011-114236 | 6/2011 |
| JP | 2013-074235 | 4/2013 |
| JP | 2013-191815 | 9/2013 |
| WO | 2010058555 | 5/2010 |
| WO | 2011016089 | 2/2011 |

OTHER PUBLICATIONS

Huang et al. (J of Applied Physics, 1994, vol. 75, p. 6280-6282).*
International Preliminary Report on Patentability for International Patent Application No. PCT/JP2014/001556 dated Sep. 20, 2016, 6 pages.
Japanese Office Action for Japanese Patent Application No. 2015-505364 dated Feb. 9, 2016.
International Search Report for PCT Application No. PCT/JP2014/001556 dated Jun. 17, 2014.
Written Opinion for PCT Application No. PCT/JP2014/001556 dated Jun. 17, 2014.
Extended European Search Report for European Patent Application No. 14843218.0 dated Oct. 12, 2017, 7 Pages.

* cited by examiner

PERMANENT MAGNET, MOTOR, AND GENERATOR

CROSS-REFERENCE TO RELATED APPLICATIONS

This application is a continuation of prior International Application No. PCT/JP2014/001556 filed on Mar. 18, 2014; the entire contents of all of which are incorporated herein by reference.

FIELD

Embodiments described herein relate generally to a permanent magnet, a motor, and a generator.

BACKGROUND

As examples of high-performance rare-earth magnets, Sm—Co magnets and Nd—Fe—B magnets are known. In these magnets, Fe and Co contribute to increase in saturation magnetization. Further, these magnets contain rare-earth elements such as Nd and Sm, which bring about large magnetic anisotropy originating in behaviors of 4f electrons of the rare-earth elements in crystal fields. Thus, large coercive force is obtained, realizing a high-performance magnet.

Such high-performance magnets are mainly used in electronic apparatuses such as motors, speakers, and measurement instruments. In recent years, demands for size and weight reduction and low-power consumption of various types of electronic apparatuses have been increasing, and in order to respond to them, permanent magnets of higher performance are demanded, in which a maximum magnetic energy product (BHmax) of permanent magnet is improved. Further, in recent years, a variable magnetic flux motor has been proposed, contributing to increase in efficiency of motors.

The Sm—Co magnets have a high Curie temperature and hence allow realizing good motor characteristics at high temperatures, but are desired to further have higher coercive force and higher magnetization and be further improved in squareness ratio. Since it is conceivable that increasing concentration of Fe is effective to high magnetization of the Sm—Co magnets, conventional manufacturing methods have a tendency to decrease the squareness ratio by increasing concentration of Fe. From these points, in order to realize a magnet for high-performance motors, technology which enables exertion of a good squareness ratio while improving the magnetization in a high Fe concentration composition is needed.

SUMMARY

An object to be solved by the embodiments is to provide a high-performance permanent magnet by controlling a metallic structure in an Sm—Co magnet.

A permanent magnet of embodiments includes a composition expressed by a composition formula: $R_pFe_qM_rCu_tCo_{100-p-q-r-t}$ (where R is at least one element selected from the group consisting of rare-earth elements, M is at least one element selected from the group consisting of Zr, Ti, and Hf, p is a number satisfying $10.5 \le p \le 12.5$ atomic %, q is a number satisfying $23 \le q \le 40$ atomic %, r is a number satisfying $0.88 \le r \le 4.5$ atomic %, and t is a number satisfying $3.5 \le t \le 10.7$ atomic %), and a metallic structure including cell phases having a $Th_2Zn_{17}$ crystal phase and Cu-rich phases having higher Cu concentration than the cell phases. An average diameter of the cell phases is 220 nm or less, and in a numeric value range from a minimum diameter to a maximum diameter of the cell phases, a ratio of a number of cell phases having a diameter in a numeric value range of less than upper 20% from the maximum diameter is 20% or less of all the cell phases.

DETAILED DESCRIPTION

Figure 1:
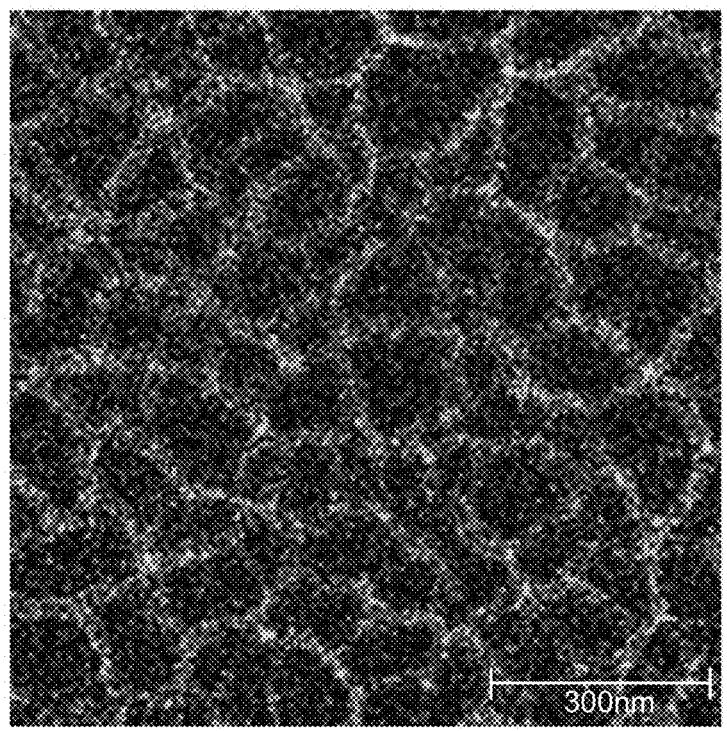
FIG. 1 is a diagram illustrating an example of a Cu mapping image by TEM-EDX.

Hereinafter, embodiments will be described with reference to drawings. Note that the drawings are schematic, for example, the relation between a thickness and a plane dimension, a ratio of thicknesses of respective layers, and the like may be different from actual ones. Moreover, in the embodiments, same reference numerals are given to substantially same components in the embodiment, and descriptions thereof are omitted.

First Embodiment

A permanent magnet of this embodiment will be described below.
<Structural Example of Permanent Magnet>

A permanent magnet of this embodiment includes a composition expressed by a composition formula: $R_pFe_qM_rCu_tCo_{100-p-q-r-t}$ (where R is at least one element selected from the group consisting of rare-earth elements, M is at least one element selected from the group consisting of Zr, Ti, and Hf, p is a number satisfying $10.5 \le p \le 12.5$ atomic %, q is a number satisfying $23 \le q \le 40$ atomic %, r is a number satisfying $0.88 \le r \le 4.5$ atomic %, and t is a number satisfying $3.5 \le t \le 10.7$ atomic %).

R in the above composition formula is an element which can bring about large magnetic anisotropy to a magnetic material. As the element R, for example, one or more elements selected from rare-earth elements including yttrium (Y) can be used, and for example, samarium (Sm), cerium (Ce), neodymium (Nd), praseodymium (Pr), and the like can be used, and use of Sm is particularly preferred. For example, when plural elements including Sm are used as the element R, it is possible to enhance performance, for example coercive force, of the magnetic material when Sm concentration is 50 atomic % or more of all elements applicable as the element R. In addition, it is further preferred that the Sm concentration be 70 atomic % or more of all elements applicable as the element R.

By setting the concentration of elements applicable as the element R to, for example, 10.5 atomic % or more and 12.5 atomic % or less, the coercive force can be increased. When the concentration of elements applicable as the element R is less than 10.5 atomic %, a large amount of α-Fe precipitates to make the coercive force small, or when the concentration of elements applicable as the element R exceeds 12.5 atomic %, saturation magnetization decreases. The concentration of elements applicable as the element R is more preferably 10.7 atomic % or more and 12.3 atomic % or less, furthermore preferably 10.9 atomic % or more and 12.1 atomic % or less.

M in the above composition formula is an element which enables the magnet to exert large coercive force by a high composition of Fe concentration. As the element M, for example, one or more elements selected from the group consisting of titanium (Ti), zirconium (Zr), and hafnium (Hf) are used. When the content r of the element M exceeds 4.5 atomic %, a hetero-phase excessively containing the element M is easily generated, making both the coercive force and the magnetization liable to decrease. Further, when the content r of the element M is less than 0.88 atomic %, the effect to increase the Fe concentration tends to decrease. That is, the content r of the element M is preferably 0.88 atomic % or more and 4.5 atomic % or less. The content r of the element M is more preferably 1.14 atomic % or more and 3.58 atomic % or less, and furthermore preferably 1.49 atomic % or more and 2.24 atomic % or less.

The element M preferably includes at least Zr. In particular, by making 50 atomic % or more of the element M be Zr, the coercive force of the permanent magnet can be increased. On the other hand, Hf among the elements M is particularly expensive, and thus when Hf is used, the use amount thereof is preferred to be small. For example, the content of Hf is preferably less than 20 atomic % of the element M.

Cu is an element which enables the magnetic material to exert high coercive force. The content of Cu is preferably 3.5 atomic % or more and 10.7 atomic % or less. When blended more than this, magnetization decreases significantly, or when blended less than this, it is difficult to obtain high coercive force and a good squareness ratio. The content t of Cu is more preferably 3.9 atomic % or more and 9.0 atomic % or less, furthermore preferably 4.3 atomic % or more and 5.8 atomic % or less.

Fe is an element mainly responsible for magnetization of the magnetic material. Blending a large amount of Fe can increase the saturation magnetization of the magnetic material, but when Fe is blended too much, it is difficult to obtain a desired crystal phase due to precipitation of α-Fe and phase separation, and the coercive force may decrease. Thus, the content q of Fe is preferably 23 atomic % or more and 40 atomic % or less. The content q of Fe is more preferably 26 atomic % or more and 36 atomic % or less, furthermore preferably 29 atomic % or more and 34 atomic % or less.

Co is an element responsible for magnetization of the magnetic material and enables the magnet to exert high coercive force. Further, when a large amount of Co is blended, a high Curie temperature can be obtained, and Co also has an operation to increase thermal stability of the magnet characteristics. A small blending amount of Co decreases these effects. However, when Co is added too much, the ratio of Fe relatively decreases, which may lead to decrease in magnetization. Further, by replacing 20 atomic % or less of Co with one or more elements selected from the group consisting of Ni, V, Cr, Mn Al, Si, Ga, Nb, Ta, and W, magnet characteristics, for example coercive force, can be increased. However, excessive replacement may lead to decrease in magnetization, and thus preferably the replacement amount of Co is 20 atomic % or less.

The permanent magnet of this embodiment has a metallic structure containing $Th_2Zn_{17}$ crystal phases (2-17 crystal phases) of hexagonal system and Cu-rich phases. In general, the Sm—Co magnet has a two-dimensional metallic structure containing cell phases having $Th_2Zn_{17}$ crystal phases (2-17 crystal phases) and a cell wall phase having a $CaCu_5$ crystal phase (1-5 crystal phase) of hexagonal system. For example, the cell wall phase is one of the Cu-rich phases, and the permanent magnet of this embodiment has a structure in which cell phases are sectioned by the Cu-rich phases. The above structure is also called a cell structure. A c-axis of the $Th_2Zn_{17}$ crystal phases is in parallel to a c-axis in a $TbCu_7$ crystal phase which is an easy magnetization axis. That is, the c-axis of the $Th_2Zn_{17}$ crystal phases exists in parallel to the easy magnetization axis. Note that the parallel may include a state within ±10 degrees from a parallel direction (substantially parallel).

The Cu-rich phases are phases with high Cu concentration. The Cu concentration of the Cu-rich phases is higher than Cu concentration of the $Th_9Zn_{17}$ crystal phases. For example, the Cu concentration of the Cu-rich phases is preferably equal to or more than 1.2 times the Cu concentration of the $Th_2Zn_{17}$ crystal phases. The Cu-rich phases exist, for example, in a linear shape or plate shape in a cross-section including the c-axis in the $Th_2Zn_{17}$ crystal phases. The structure of the Cu-rich phases is not particularly limited, and may be, for example, a $CaCu_5$ crystal phase (1-5 crystal phase) of hexagonal system, or the like. Further, the permanent magnet of this embodiment may have plural Cu-rich phases of different phases.

The magnetic wall energy of the Cu-rich phases is higher than the magnetic wall energy of the $Th_2Zn_{17}$ crystal phases, and this difference in magnetic wall energy becomes a barrier to magnetic wall movement. That is, by the Cu-rich phases functioning as a pinning site, magnetic wall movement between plural cell phases can be suppressed. This is also called a magnetic wall pinning effect.

In the Sm—Co magnet including Fe of 23 atomic % or more, the Cu concentration of the Cu-rich phases is preferably 30 atomic % or more. More preferably, the Cu concentration is 35 atomic % or more, furthermore preferably 40 atomic % or more, furthermore preferably 45 atomic % or more. By increasing the Cu concentration of the Cu-rich phases, the coercive force and the squareness ratio can be increased. In the area where the Fe concentration is high, dispersion tends to occur in the Cu concentration of the Cu-rich phases and, for example, a Cu-rich phase having a large magnetic wall pinning effect and a Cu-rich phase having a small magnetic wall pinning effect occur, and the coercive force and the squareness ratio decrease.

When a magnetic wall which deviated from the pinning site moves, the magnetization reverses by the moved amount, and thus the magnetization decreases. If the magnetic wall deviates from the pinning site all at once by a certain magnetic field when an external magnetic field is applied, the magnetization becomes difficult to decrease by application of the magnetic field, and a good squareness ratio can be obtained. In other words, if the magnetic wall deviates from the pinning site by a magnetic field lower than the coercive force and the magnetic wall moves when the magnetization is applied, it is conceivable that the magnetization decreases by the moved amount, leading to deterioration of the squareness ratio. It is conceivable that, in order to suppress deterioration of the squareness ratio, it is important to decrease an area where magnetic reversal occurs in a metallic structure.

In the permanent magnet of this embodiment, the cell phases are made to be single domains by dividing the cell phases by the Cu-rich phases. In the cell phases of single domain, the magnetic wall does not exist, and magnetization changes only by rotation of magnetization. Increasing the ratio of the cell phases of single domain can suppress the magnetization reversal due to movement of the magnetic wall, and thus decrease in magnetization is suppressed and the squareness ratio can be improved. For example, division of the cell phases by the Cu-rich phases proceeds and the diameter of the cell phases in the metallic structure becomes small, generation energy of the magnetic wall increases, and the cell phases can easily become the single domain. In order to make the cell phases to be the single domain, for example, the diameter of the cell phases is preferably equal to or less than 220 nm. This is a much smaller value than that of a conventional permanent magnet whose mean diameter of cell phases is about 300 nm to 400 nm. It is conceivable that the diameter of the cell phases depends on, for example, the Fe concentration in the metallic structure in addition to the Cu-rich phases. When the Fe concentration becomes high, a magnetic anisotropy constant decreases, and the diameter of the cell phases tends to decrease.

In this embodiment, the metallic structure such as the $Th_2Zn_{17}$ crystal phases and the Cu-rich phases is recognized as follows for example. First, a sample is observed with a transmission electron microscope (TEM). The sample used for observation is one after being subjected to an aging treatment. At this time, this sample is preferably a non-magnetized article.

The concentration of respective elements of the cell phases and the Cu-rich phases can be measured by, for example, using TEM-energy dispersive X-ray spectroscopy (TEM-EDX) utilizing TEM. When the concentration of respective elements is measured by TEM-EDX, a sample for measurement is cut out from an inside at 1 mm or more of the sample surface. Further, a plane perpendicular to the easy magnetization axis (c-axis) is observed by observation magnification of 200 k times. An example of a Cu mapping object obtained thus is illustrated in FIG. 1. Net-like areas which are relatively white in FIG. 1 correspond to the Cu-rich phases. The areas surrounded by the white net-like domains are the $Th_2Zn_{17}$ crystal phases (cell phases). By forming the Cu-rich phases so as to surround the cell phases, the suppression effect of magnetic wall movement can be further increased. Note that the perpendicular may include a state within ±10 degrees from a perpendicular direction (substantially perpendicular).

The diameter of the cell phases can be obtained as follows. In the mapping object of TEM-EDX, an arbitrary cell phase is chosen, and a longest line A having both ends in contact with Cu-rich phases is drawn with respect to the chosen cell phase. Next, across a center point of this straight line A, a straight line B perpendicular to the straight line A and having both ends in contact with the Cu-rich phases is drawn. The average of the lengths of the straight line A and the straight line B is assumed as the diameter of the cell phase. By the above procedure the diameters of 30 arbitrary cell phases ($D_{cell1}$ to $D_{cell30}$) are measured, and the average value ($D_{cellave}$) of $D_{cell1}$ to $D_{cell30}$ is obtained. The $D_{cellave}$ is calculated in five visual fields with respect to one sample, and the average of respective $D_{cellave}$ values is defined as the diameter ($D_{cell}$) of the cell phases.

In the permanent magnet of this embodiment, in the numeric value range from the minimum diameter to the maximum diameter of the cell phases, the ratio of a number of cell phases having a diameter in a numeric value range of less than upper 20% from the maximum diameter is 20% or less of all the cell phases. By decreasing the ratio of the cell phases having a relatively large diameter, a favorable squareness ratio can be obtained.

The distribution of the diameter of cell phases can be obtained as follows. The numeric value range from a minimum diameter ($D_{cellmin}$) of the cell phases to a maximum diameter ($D_{cellmax}$) of cell phases measured in an arbitrary visual field is divided evenly into 10 numeric value ranges. Next, the number of cell phases having the diameter of each of the divided numeric value ranges is counted. Among the cell phases in the respective counted numeric value ranges, assuming that the minimum diameter is 0% and the maximum diameter is 100%, the sum of the number of cell phases having a diameter in the numeric value range of more than 80% and not more than 90% (numeric value range of less than upper 10% to 20% from the maximum diameter) and the number of cell phases having a diameter in the numeric value range of more than 90% and not more than 100% (numeric value range of less than upper 10% from the maximum diameter) is taken as the number $N_{max20}$ of cell phases having a diameter in the numeric value range of less than upper 20% from the maximum diameter. The largeness of $N_{max20}$ means that a distribution of the diameter of the cell phases spreads, that is, the diameter of the cell phases disperses. In the permanent magnet of this embodiment, $N_{max20}$ can be less than 20, in other words, the number ratio of cell phases having a diameter in the numeric value range of less than upper 20% from the maximum diameter in the numeric value range from the minimum diameter to the maximum diameter of the cell phases can be made 20% or less (more than 80% and not more than 100% when the minimum diameter is 0% and the maximum diameter is 100%) of all the cell phases (counted cell phases).

Note that for measurement of the concentration of elements of each phase, a 3-dimensional atom probe (3DAP) may be used. An analysis method using 3DAP is such that an observed sample is subjected to magnetic field evaporation by applying a voltage, and then ions evaporated by electric field are detected by a two-dimensional detector, to thereby identify an atomic arrangement. Ion species are identified by a flight time until reaching the two-dimensional detector, individually detected ions are detected sequentially in a depth direction, and the ions are aligned in the order of detection (reconstructed), thereby obtaining a three-dimensional atomic distribution. As compared to the concentration measurement of TEM-EDX, each element concentration in the cell phases can be measured more accurately.

Measurement of element concentrations in respective phases by 3DAP is carried out following the procedure described below. First, the sample is cut into a flake by dicing, from which a needle-shaped sample for a pickup atom probe (AP) is made by focused ion beam (FIB).

Measurement by 3DAP is performed in an inside portion of a sintered compact. The measurement of the inside portion of the sintered compact is as follows. First, in a center portion of a longest side on a plane having a largest area, a composition is measured in both a surface portion of the cross section taken perpendicularly along the side (in the case of a curve, perpendicular to a tangential line of the center portion) and an inside portion. Regarding measurement positions, a first reference line drawn perpendicularly to the side and inward to an end portion from the position of ½ of each side in the cross section being a starting point, and a second reference line drawn inward to an end portion from the center of each corner portion being a starting point at the position of ½ of an inside corner angle of the corner portion, are provided, and the position of 1% of the length of the reference line from the starting points of the first reference line and the second reference line is defined as a surface portion, and the position of 40% is defined as an inside portion. Note that when the corner portion has a curvature by chamfering or the like, an intersection point of extended adjacent sides is taken as an end portion of a side (center of the corner portion). In this case, the measurement position is a position not from the intersection point but from a portion in contact with the reference lines.

By taking the measurement positions as above, when the cross section is a square for example, there are four each of the first reference line and the second reference line, eight reference lines in total, and there are eight measurement positions each in the surface portion and the inside portion. In this embodiment, it is preferred that all eight positions in each of the surface portion and the inside portion be in the above-described composition range, but it will suffice when at least four or more positions in each of the surface portion and the inside portion are in the above-described composition range. In this case, the relation between the surface portion and the inside portion on one reference line is not defined. The observation surface inside a sintered compact defined in this manner is polished to be smooth, and thereafter the observation is performed. For example, the measurement positions of TEM-EDX in the concentration measurement are 20 arbitrary points in the cell phases and the Cu-rich phases, the average of measurement values excluding the maximum value and the minimum value is obtained from measurement values at these points, and this average is taken as the concentration of each element. The measurement of 3DAP also complies this.

In the measurement results of concentration in the Cu-rich phases by using the above-described 3DAP, the concentration profile of Cu in the Cu-rich phases is preferred to be sharper. Specifically, it is preferred that a full width at half maximum (FWHM) of the concentration profile of Cu be 5 nm or less, and higher coercive force can be obtained in this case. This is because when the distribution of Cu in the Cu-rich phase is sharp, a magnetic wall energy difference between the cell phases and the Cu-rich phases rapidly occurs, and it becomes easier to pin the magnetic wall.

The full width at half maximum (FWHM) of the concentration profile of Cu in the Cu-rich phases can be obtained as follows. A value where the Cu concentration is highest (PCu) is obtained from the Cu profile of 3DAP based on the above-described method, and the width of a peak where it is a half value of this value (PCu/2), that is, the full width at half maximum (FWHM) is obtained. Such measurement is performed for 10 peaks, and the average of these values is defined as the full width at half maximum (FWHM) of the Cu profile. When the full width at half maximum (FWHM) of the Cu profile is 3 nm or less, the effect to increase the coercive force further improves, and when it is 2 nm or less, a furthermore excellent improving effect of the coercive force can be obtained.

The squareness ratio is defined as follows. First, direct current magnetization characteristics at room temperature are measured by a direct current B-H tracer. Next, from the BH curve obtained from measurement results, residual magnetization $M_r$, coercive force and maximum energy product (BH)max are obtained, which are basic characteristics of a magnet. At this time, a logical maximum value (BH)max is obtained with the following formula (1) by using $M_r$.

$$(BH)max(\text{logical value}) = M_r^2/4\mu_0 \quad (1)$$

The squareness ratio is evaluated by the ratio of (BH)max obtained by measurement and (BH)max (logical value), and is obtained with the following formula (2).

$$(BH)max(\text{actual value})/(BH)max(\text{logical value}) \times 100 \quad (2)$$

The permanent magnet of this embodiment is also used as, for example, a bond magnet. For example, by using the magnetic material of this embodiment for a variable magnet in a variable magnetic flux drive system, efficiency increase, size reduction, and cost reduction of the system becomes possible. In order to use the permanent magnet of this embodiment as the variable magnet, it is necessary to change aging treatment conditions to make, for example, the coercive force to be 100 kA/M or more and 350 kA/M or less.

<Method of Manufacturing the Permanent Magnet>

Next, an example of a method of manufacturing the permanent magnet will be described. First, an alloy powder containing predetermined elements necessary for composing the permanent magnet is prepared. For example, a flaky alloy thin strip is produced by a strip cast method or the like, and thereafter the flaky alloy thin strip is pulverized to prepare the alloy powder.

In the production of the alloy thin strip using the strip cast method, a thin strip sequentially solidified to a thickness of 1 mm or less can be produced by tilt-pouring a molten alloy onto a chill roll rotating at a peripheral speed of 0.1 m/second or more and 20 m/second or less. When the peripheral speed is less than 0.1 m/second, dispersion of composition tends to occur in the thin strip. Further, when the peripheral speed exceeds 20 m/second, magnetic characteristics may decrease by excessive refining of crystal grains, or the like. The peripheral speed of the chill roll is 0.3 m/second or more and 15 m/second or less, more preferably 0.5 m/second or more and 12 m/second or less. Further, the alloy powder can be prepared also by pulverizing an alloy ingot obtained by casting after arc melting or high-frequency melting, or the like. Further, the alloy powder may be prepared by using a mechanical alloying method, a mechanical grinding method, a gas atomizing method, a reduction diffusion method, or the like.

Moreover, by subjecting the above alloy powder or an alloy material before pulverization to a heat treatment, this material can be homogenized. For example, the material can be pulverized by using a jet mill, a ball mill, or the like. Note that it is possible to prevent oxidation of the powder by pulverizing a material in an inert gas atmosphere or an organic solvent.

In the powder after pulverization, the degree of orientation becomes high and the coercive force becomes large when the average grain diameter is 2 μm or more and 5 μm or less and the ratio of powder with a grain diameter of 2 μm or more and 10 μm or less is 80% or more of the whole powder. In order to realize this, pulverization with a jet mill is preferred.

For example, when it is pulverized by a ball mill, a large amount of fine powder with a grain diameter of sub-micron level is contained even if the average grain diameter of the powder is 2 μm or more and 5 μm or less. When this fine powder aggregates, it becomes difficult for the c-axis of crystal in the TbCu$_7$ phase to align in the easy magnetization axis direction in the magnetic field orientation during pressing, and the orientation tends to be poor. Further, there is a concern that such fine powder increases the amount of oxides in the sintered compact, and decreases the coercive force. In particular, when the Fe concentration is 23 atomic % or more, it is desired that the ratio of powder with a grain diameter of 10 μm or more be 10% or less of the entire powder in the power after pulverization. When the Fe concentration is 23 atomic % or more, the amount of a hetero-phase in the ingot as a raw material increases. In this hetero-phase, not only the amount of powder increases but also the grain diameter tends to increase, and the grain diameter can even become 20 μm or more.

When such an ingot is pulverized, for example, the powder with a grain diameter of 15 μm or more can become a hetero-phase powder as it is. When such a pulverized powder containing a coarse hetero-phase powder is pressed in a magnetic field to make a sintered compact, the hetero-phase remains and causes decrease in coercive force, decrease in magnetization, decrease in squareness, and the like. When the squareness decreases, magnetization becomes difficult. In particular, magnetization to a rotor or the like after assembly becomes difficult. By thus making the powder with a grain diameter of 10 μm or more to be 10% or less of the whole, the coercive force can be increased while suppressing reduction in the squareness ratio in the high Fe concentration composition containing 23 atomic % or more of Fe.

Next, the alloy powder is charged in a metal mold placed in an electromagnet, and is press-formed while applying a magnetic field, to thereby produce a green compact with an oriented crystal axis. Moreover, sintering is performed on this green compact. In the sintering, for example, a heat treatment is performed by retaining for one hour or more and 15 hours or less at temperatures of 1100° C. or higher and 1210° C. or lower. Thus, a dense sintered compact can be obtained.

For example, when the retention temperature during sintering is lower than 1100° C., the density of the produced sintered compact is liable to be low. Further, when it is higher than 1210° C., magnetic characteristics may decrease by excessive evaporation of Sm in the powder, or the like. A more preferred retention temperature during sintering is 1150° C. or higher and 1205° C. or lower, furthermore preferably 1165° C. or higher and 1195° C. or lower. On the other hand, when the retention time during sintering is less than one hour, the density tends to be uneven, and thus the magnetization is liable to decrease. Moreover, the crystal grain diameter of the sintered compact becomes small and the crystal grain boundary ratio becomes high, and thus the magnetization is liable to decrease. Further, when the retention time during sintering exceeds 15 hours, evaporation of the element R in the powder becomes excessive, and the magnetic characteristics may decrease. A more preferred retention time during sintering is 2 hours or more and 13 hours or less, furthermore preferably four hours or more and ten hours or less.

Note that oxidation can be suppressed by performing the sintering in vacuum or in argon gas. Further, the sintered compact density can be improved by maintaining the vacuum until getting close to the retention temperature, and thereafter it is switched to the Ar atmosphere and isothermal holding of it.

Next, a solution heat treatment is performed on the obtained sintered compact, so as to control the crystal structure. In the solution heat treatment, for example, a heat treatment is performed by retaining at temperatures of 1100° C. or higher and 1190° C. or lower for three hours or more and 28 hours or less. Thus, the $TbCu_7$ crystal phase which is a precursor of a phase separation structure can be easily obtained.

When the retention temperature is lower than 1100° C. and when it exceeds 1190° C., the ratio of the $TbCu_7$ crystal phase existing in the sample after the solution heat treatment is small, and the magnetic characteristics may decrease. The retention temperature is preferably 1110° C. or higher and 1180° C. or lower, more preferably 1120° C. or higher and 1170° C. or lower.

Further, when the retention time is less than three hours, the constituting phase tends to be uneven, the coercive force tends to decrease, the crystal grain diameter of the sintered compact tends to be small, the crystal grain boundary ratio becomes high, and the magnetization tends to decrease. Further, when the retention temperature exceeds 28 hours, the magnetic characteristic may decrease by evaporation of the element R in the sintered compact, or the like. The retention time is preferably 4 hours or more and 24 hours or less, more preferably 10 hours or more and 18 hours or less.

Note that oxidation of the powder can be suppressed by performing the solution heat treatment in vacuum or an inert atmosphere of argon gas or the like. Further, the solution heat treatment may be performed sequentially to the sintering.

Moreover, rapid cooling is performed after the isothermal holding. By performing the rapid cooling, the $TbCu_7$ crystal phase can be maintained even at room temperature. By setting a rapid cooling rate of 170° C./minute or more, the $TbCu_7$ crystal phase can be stabilized, and the coercive force can be easily exerted. For example, when the rapid cooling rate is less than 170° C./minute, the $Ce_2Ni_7$ crystal phase (2-7 crystal phase) can be generated easily during cooling. The magnetization may decrease due to the existence of the 2-7 crystal phase, and the coercive force may also decrease. This is because Cu is often enriched in the 2-7 crystal phase, and thus the Cu concentration decreases in the main phase, thereby making it difficult for the phase separation by an aging treatment to occur. The cooling rate can often be important particularly in a composition including the Fe concentration of 23 atomic % or more.

Next, an aging treatment is performed on the sintered compact after rapid cooling. The aging treatment is a treatment to increase the coercive force of the magnet by controlling the metallic structure, and has a purpose of phase separating the metallic structure of the magnet into plural phases such as the $Th_2Zn_{17}$ crystal phases and the Cu-rich phases.

Figure 2:
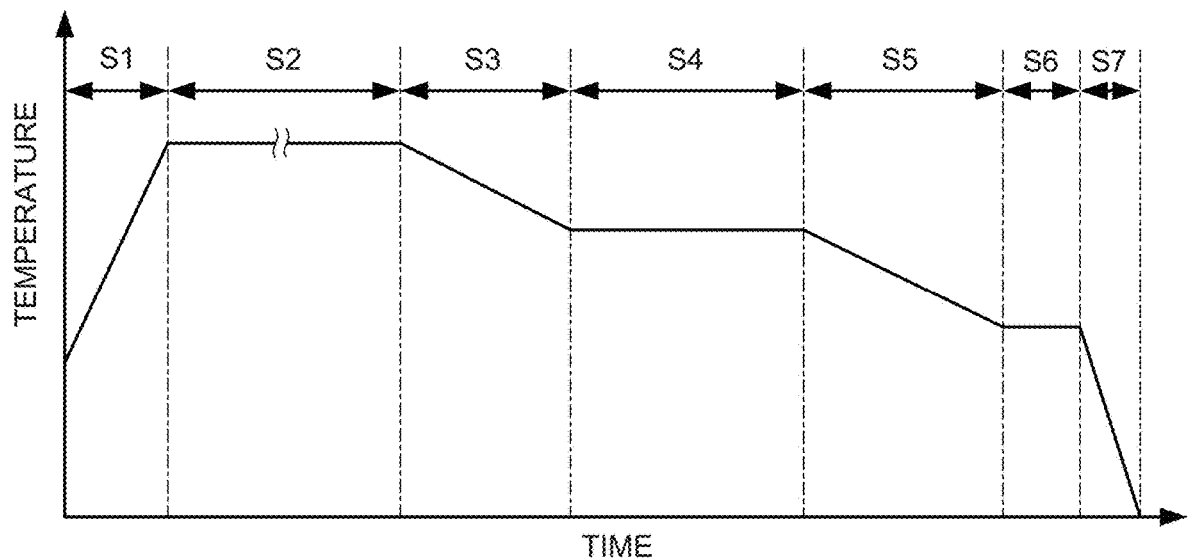
FIG. 2 is a diagram for explaining an example of an aging treatment.

FIG. 2 is a diagram for explaining an example of the aging treatment, in which the horizontal axis represents time and the vertical axis represents temperature. In the aging treatment, after it is heated to temperatures of 760° C. or higher and 830° C. or lower as step S1, it is retained at the reached temperature thereof for 25 hours or more and 60 hours or less as step S2. Next, as step S3, it is slowly cooled to temperatures of 450° C. or higher and 650° C. or lower at a cooling rate of 0.2° C./minute or more and 0.8° C./minute or less, and thereafter retained at the reached temperature thereof for 4 hours or more and 24 hours or less as step S4. Subsequently, it is cooled to temperatures of 350° C. or higher and 430° C. or lower at a cooling rate of 0.2° C./minute or more and 0.8° C./minute or less as step S5, and thereafter retained at the reached temperature thereof for 0.5 hour or more and less than 8 hours as step S6, thereby performing the heat treatment. Subsequently, it is cooled to room temperature as step S7. Thus, the sintered compact magnet can be obtained.

In step S2, when the retention temperature is higher than 830° C., $N_{max20}$ becomes large even if it is slowly cooled in step S3, and it is difficult to obtain the sufficient squareness ratio. Further, when the retention temperature is lower than 760° C., the cellular structure cannot be obtained sufficiently, making it difficult for the magnet to exert the coercive force. The retention temperature in step S2 is more preferably 780° C. or higher and 820° C. or lower for example. Further, in step S2, when the retention time is less than 25 hours, the phase separation structure becomes insufficient, making it difficult for the magnet to exert the coercive force. Further, when the retention time is longer than 60 hours, the Cu-rich phases become excessively thick, and it is possible that the squareness ratio deteriorates. The retention time in step S2 is more preferably 25 hours or more and 40 hours or less for example.

In step S4, when the retention temperature is higher than 650° C., a generation interval of the CaCu$_5$ crystal phase spreads, and it is difficult for the diameter of the cell phases to be small. Further, when the retention temperature is lower than 450° C., a low-temperature hetero-phase, for example, a Ce$_2$Ni$_7$ crystal phase (2-7 crystal phase) is generated. The Ce$_2$Ni$_7$ crystal phase has high Cu concentration and makes it difficult to obtain a sufficient phase separation structure, and it is conceivable that it adversely affects all of the coercive force, the magnetization, and the squareness ratio. The retention temperature in step S4 is more preferably 500° C. or higher and 600° C. or lower for example.

Further, in step S4 after the slow cooling, when the retention time is less than four hours, generation of cell phases can become insufficient. Further, when the retention time is 24 hours or more, the volume fraction of the Cu-rich phases may become excessive, and the magnetization may decrease. The retention time in step S4 is, for example, more preferably 6 hours or more and 16 hours or less, furthermore preferably 8 hours or more and 12 hours or less. By performing the retention under the above conditions after the slow cooling, mutual diffusion of Cu elements and Fe elements and Co elements proceeds, making it easy to generate the Cu-rich phases. Accordingly, the Cu-rich phases are formed so as to divide coarse cell phases, and thus the diameter of the cell phases can be made small and the cell phases can be single domains. Further, by the aging treatment, the Cu-rich phases can be generated easily in the grain boundary of the permanent magnet. Accordingly, bonding force increases in the metallic structure, and mechanical strength of the permanent magnet can be increased.

When cooling is performed to temperatures lower than 350° C. as step S5, the low-temperature hetero-phase as described above is easily generated. Further, when cooling is performed to temperatures exceeding 430° C., the Cu concentration in the Cu-rich phases does not become sufficiently high, and thus sufficient coercive force may not be obtained. Further, when the retention time after the cooling exceeds 8 hours, the low-temperature hetero-phase is generated, and it is possible that sufficient magnetic characteristics cannot be obtained.

By setting the cooling rate in step S5 to be slower than the cooling rate in step S3, the effect of improving the squareness ratio can be increased. Further, by setting the cooling rate in step S5 to be 0.2° C./minute or more and 0.8° C./minute or less, the Cu concentration of the Cu-rich phases can be increased. Note that although in the method of manufacturing the permanent magnet of this embodiment the slow cooling is performed in two stages by providing the retention period, the retention period may be provided at plural temperatures to perform the slow cooling in three or more stages. Further, the heat treatment may be performed before the aging treatment in the above-described step S1 to step S7. This further makes it easy to generate the Cu-rich phases. The permanent magnet can be manufactured as described above.

Second Embodiment

The permanent magnet of the first embodiment can be used for various types of motors and generators. Further, it is also possible to be used for stationary magnets and variable magnets of variable magnetic flux motors and variable magnetic flux generators. The permanent magnet of the first embodiment is used to constitute various motors and generators. When the permanent magnet of the first embodiment is applied to a variable magnetic flux motor, the known technology can be applied to a configuration and a drive system of the variable magnetic flux motor.

Figure 3:
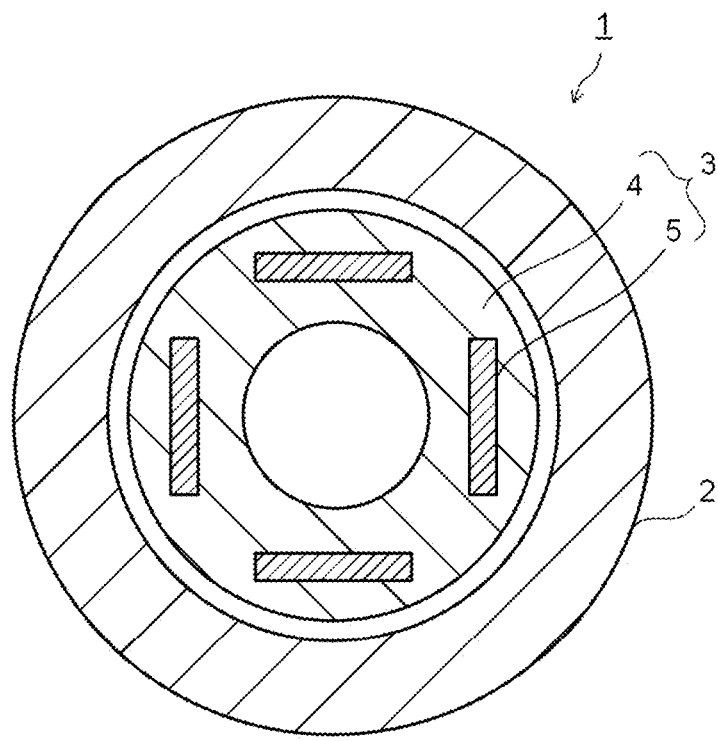
FIG. 3 is a diagram illustrating a permanent magnet motor.

Next, a motor and a generator of this embodiment will be described with reference to drawings. FIG. 3 is a diagram illustrating a permanent magnet motor in this embodiment. In the permanent magnet motor 1 illustrated in FIG. 3, a rotor (rotating part) 3 is disposed in a stator (stationary part) 2. In an iron core 4 of the rotor 3, permanent magnets 5 which are the permanent magnet of the first embodiment are disposed. By using the permanent magnet of the first embodiment, efficiency increase, size reduction, cost reduction, and the like of the permanent magnet motor 1 can be achieved based on characteristics of respective permanent magnets, and the like.

Figure 4:
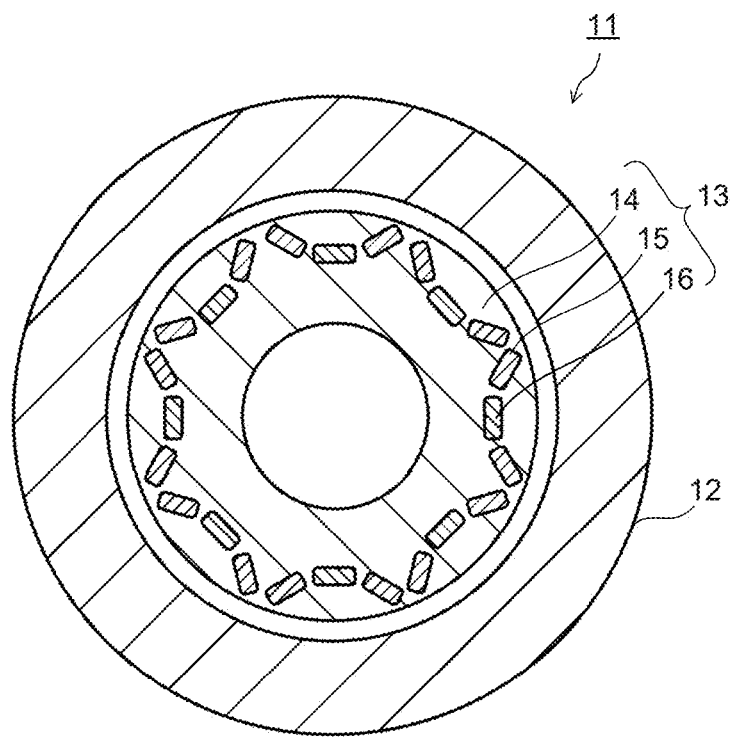
FIG. 4 is a diagram illustrating a variable magnetic flux motor.

FIG. 4 is a diagram illustrating a variable magnetic flux motor according to this embodiment. In the variable magnetic flux motor 11 illustrated in FIG. 4, a rotor (rotating part) 13 is disposed in a stator (stationary part) 12. In an iron core 14 of the rotor 13, permanent magnets of the first embodiment are disposed as stationary magnets 15 and variable magnets 16. The magnetic flux density (magnetic flux amount) of the variable magnets 16 is variable. The variable magnets 16 have a magnetization direction orthogonal to a Q-axis direction and hence is not affected by a Q-axis current, and can be magnetized by a D-axis current. The rotor 13 is provided with a magnetization winding (not illustrated). It is structured such that by passing a current from a magnetization circuit through this magnetization winding, a magnetic field thereof directly operates on the variable magnets 16.

The permanent magnet of the first embodiment enables to obtain preferred coercive force in the stationary magnets 15. When the permanent magnet of the first embodiment is applied to the variable magnets 16, the coercive force may be controlled to be in the range of for example, 100 kA/m or more and 500 kA/m or less by changing the various conditions (aging treatment conditions and the like) of the above-described manufacturing method. Note that in the variable magnetic flux motor 11 illustrated in FIG. 4, although the permanent magnet of the first embodiment can be used for both the stationary magnets 15 and the variable magnets 16, the permanent magnet of the first embodiment may be used for either one of the magnets. The variable magnetic flux motor 11 is able to output large torque with a small device size, and thus is preferred for motors of hybrid vehicle, electric-vehicle, and the like for which high power and small size of motor are required.

Figure 5:
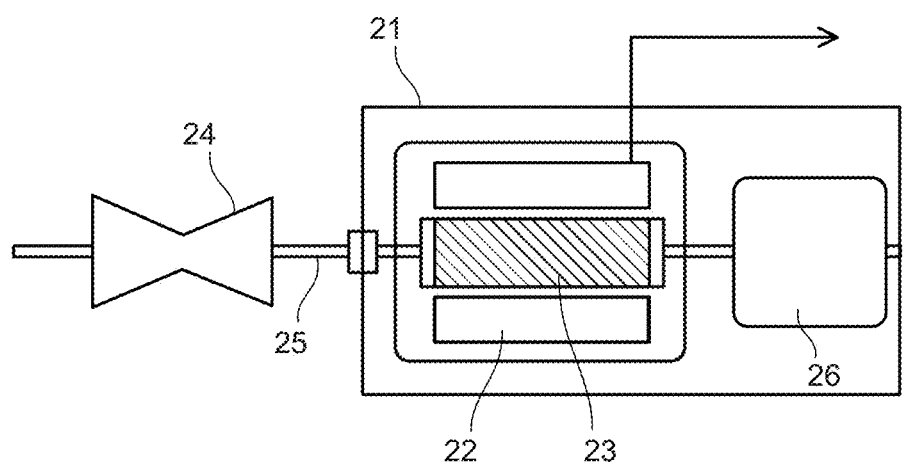
FIG. 5 is a diagram illustrating a generator.

FIG. 5 illustrates a generator according to this embodiment. The generator 21 illustrated in FIG. 5 has a stator (stationary part) 22 using the permanent magnet of the first embodiment. A rotor (rotating part) 23 disposed inside the stator (stationary part) 22 is connected to a turbine 24 provided on one end of the generator 21 via a shaft 25. The turbine 24 is rotated by fluid supplied from the outside for example. In addition, it is also possible to rotate the shaft 25 by transmitting kinetic rotations such as regenerative energy of an automobile, instead of the turbine 24 rotated by fluid. For the stator 22 and the rotor 23, various publicly known structures can be employed.

The shaft 25 is in contact with a commutator (not illustrated) disposed on the opposite side of the turbine 24 with respect to the rotor 23, and electromotive force generated by rotations of the rotor 23 is increased in voltage to a system voltage and transmitted as output of the generator 21 via an isolated phase bus and a main transformer (not illustrated). The generator 21 may be either of an ordinary generator and a variable magnetic flux generator. Note that static electricity from the turbine 2 or electrostatic charges by an axial current accompanying power generation occur on the rotor 23. Accordingly, the generator 21 has a brush 26 for discharging the electrostatic charges of the rotor 23.

By applying the permanent magnet of the first embodiment to a generator as above, effects such as efficiency increase, size reduction, and cost reduction can be obtained.

It should be noted that while several embodiments of the present invention have been described, these embodiments have been presented by way of example, and are not intended to limit the scope of the inventions. The novel embodiments described herein may be implemented in a variety of other forms, and various omissions, substitutions and changes thereof may be made within a range not departing from the spirit of the inventions. Such embodiments and modifications are included in the scope and spirit of the invention, and also included in the inventions described in the claims and their equivalents.

EXAMPLE

In this Example, specific examples of the permanent magnet will be described.

Example 1, Example 2

Respective materials used for the permanent magnet were weighed by predetermined ratios and mixed, and thereafter arc melted in an Ar gas atmosphere to produce an alloy ingot. The alloy ingot was heat treated by retaining at 1180° C. for 12 hours, and thereafter coarse grinding and pulverizing with a jet mill were performed on the alloy ingot, to thereby prepare an alloy powder as a material powder of the magnet. The obtained alloy powder was press molded in a magnetic field to produce a compression-molded body.

Next, the compression-molded body of the alloy powder was disposed in a chamber of a firing furnace, the chamber was evacuated and then heated to 1170° C. and retained at the reached temperature for 20 minutes, thereafter an Ar gas was introduced, the chamber was heated to 1200° C. in the Ar atmosphere, and sintering was performed by retaining at the reached temperature for six hours. Next, the sintered compact was subjected to a solution heat treatment by retaining at 1165° C. for 12 hours, and thereafter cooled. Note that the cooling rate after the solution heat treatment was 170° C./minute.

Next, the sintered compact after the solution heat treatment was retained at 720° C. for two hours, and thereafter slowly cooled to 300° C. at a cooling rate of 1.5° C./minute. Moreover, as described in Table 2, it was heated to 830° C. as step S1 of FIG. 2, and retained at 830° C. for 30 hours as step S2. Thereafter, it was slowly cooled to 600° C. at a cooling rate of 0.9° C./minute as step S3, and retained at the reached temperature for eight hours as step S4. Thereafter, it was slowly cooled to 400° C. at a cooling rate of 0.9° C./minute as step S5, and retained at the reached temperature for one hour as step S6. Thereafter, it was furnace-cooled to room temperature as step S7, thereby obtaining a magnet.

Further, a composition analysis on the magnets was performed by an inductively coupled plasma (ICP) method. Note that the composition analysis by the ICP method was performed by the following procedure. First, a sample taken from a described measurement position was pulverized in a mortar, a certain amount of the pulverized sample was weighed and put into a quartz beaker. Moreover, a mixed acid (containing a nitric acid and a hydrochloric acid) was put into the beaker, and the beaker was heated to about 140° C. on a hot plate, so as to completely melt the sample in the beaker. Moreover, after letting cool, the sample was moved to a PFA volumetric flask to have a constant volume, thereby preparing a sample solution.

Moreover, components contained in the sample solution were quantitated by a calibration curve method using an ICP emission spectrophotometer. As the ICP emission spectrophotometer, SPS4000 made by SII Nano Technology was used. The compositions of the obtained magnets are as described in Table 1. Further, diameters of cell phases, $N_{max20}$, Cu concentration of Cu-rich phases, squareness ratios, coercive force, and residual magnetization of the magnets were measured. Results thereof are described in Table 3. Note that as a measurement apparatus, HD2300 made by Hitachi High-Technologies Corporation was used.

Example 3, Example 4, Example 5

Respective materials were weighed by predetermined ratios and mixed, and thereafter high-frequency melted in an Ar gas atmosphere to produce an alloy ingot. The alloy ingot was coarsely ground and then heat treated at 1190° C. for four hours, and cooled to room temperature by rapid cooling. Moreover, coarse grinding and pulverizing with a jet mill were performed, to thereby prepare an alloy powder as a material powder of the magnet. The alloy powder was further press molded in a magnetic field to produce a compression-molded body.

Next, the compression-molded body of the alloy powder was disposed in a chamber of a firing furnace, the chamber was evacuated until the degree of vacuum therein becomes $8.5 \times 10^{-3}$ Pa and then heated to 1160° C. and retained at the reached temperature for 30 minutes, and thereafter an Ar gas was introduced into the chamber. The temperature inside the chamber in an Ar atmosphere was increased to 1195° C., and sintering was performed by retaining at the reached temperature for five hours. Next, the sintered compact was subjected to a solution heat treatment by retaining at 1120° C. for 16 hours, and thereafter cooled. Note that the cooling rate after the solution heat treatment was 180° C./minute.

Next, the sintered compact after the solution heat treatment was retained at 700° C. for four hours, and thereafter slowly cooled to 400° C. at a cooling rate of 1° C./minute. Moreover, as described in Table 2, it was heated to 800° C. as step S1 of FIG. 2, and retained at 800° C. for 55 hours as step S2. Thereafter, it was slowly cooled to 450° C. at a cooling rate of 0.9° C./minute as step S3, and retained at the reached temperature for four hours as step S4. Thereafter, it was slowly cooled to 360° C. at a cooling rate of 0.45° C./minute as step S5, and retained at the reached temperature for 0.5 hour as step S6. Thereafter, it was furnace-cooled to room temperature as step S7, thereby obtaining a magnet.

Moreover, components contained in the sample solution were quantitated similarly to Example 1. The compositions of the obtained magnets are as described in Table 1. Further, diameters of cell phases, $N_{max20}$, Cu concentration of Cu-rich phases, squareness ratios, coercive force, and residual magnetization of the magnets were measured. Results thereof are described in Table 3.

Example 6, Example 7

Respective materials were weighed by predetermined ratios and mixed, and thereafter high-frequency melted in an Ar gas atmosphere to produce an alloy ingot. The alloy ingot was coarsely ground and then heat treated at 1180° C. for 12 hours, and cooled to room temperature by rapid cooling. Moreover, coarse grinding and pulverizing with a jet mill were performed, to thereby prepare an alloy powder as a material powder of the magnet. The alloy powder was further press molded in a magnetic field to produce a compression-molded body.

Next, the compression-molded body of the alloy powder was disposed in a chamber of a firing furnace, the chamber was evacuated until the degree of vacuum therein becomes $7.0 \times 10^{-3}$ Pa and then heated to 1165° C. and retained at the reached temperature for 5 minutes, and thereafter an Ar gas was introduced into the chamber. The temperature inside the chamber in an Ar atmosphere was increased to 1195° C., and sintering was performed by retaining at the reached temperature for six hours. Next, the sintered compact was subjected to a solution heat treatment by retaining at 1115° C. for 12 hours, and thereafter cooled. Note that the cooling rate after the solution heat treatment was 220° C./minute.

Next, the sintered compact after the solution heat treatment was retained at 680° C. for one hour, and thereafter slowly cooled to 340° C. at a cooling rate of 1.5° C./minute. Moreover, as described in Table 2, it was heated to 815° C. as step S1 of FIG. 2, and retained at 815° C. for 45 hours as step S2. Thereafter, it was slowly cooled to 500° C. at a cooling rate of 0.6° C./minute as step S3, and retained at the reached temperature for ten hours as step S4. Thereafter, it was slowly cooled to 400° C. at a cooling rate of 0.5° C./minute as step S5, and retained at the reached temperature for 2 hours as step S6. Thereafter, it was furnace-cooled to room temperature as step S7, thereby obtaining a magnet.

The compositions of the respective magnets were confirmed by the ICP method similarly to other examples. The compositions of the obtained magnets are as described in Table 1. Further, diameters of cell phases, $N_{max20}$, Cu concentration of Cu-rich phases, squareness ratios, coercive force, and residual magnetization of the magnets were measured similarly to other examples. Results thereof are described in Table 3.

Example 8

Respective materials were weighed by predetermined ratios and mixed, and thereafter high-frequency melted in an Ar gas atmosphere to produce an alloy ingot. The alloy ingot was coarsely ground and then heat treated at 1160° C. for eight hours, and cooled to room temperature by rapid cooling. Moreover, coarse grinding and pulverizing with a jet mill were performed, to thereby prepare an alloy powder as a material powder of the magnet. The alloy powder was further press molded in a magnetic field to produce a compression-molded body.

Next, the compression-molded body of the alloy powder was disposed in a chamber of a firing furnace, the chamber was evacuated until the degree of vacuum therein becomes $9.0 \times 10^{-3}$ Pa and then heated to 1160° C. and retained at the reached temperature for 15 minutes, and thereafter an Ar gas was introduced into the chamber. The temperature inside the chamber in an Ar atmosphere was increased to 1190° C., and sintering was performed by retaining at the reached temperature for four hours. Next, the sintered compact was subjected to a solution heat treatment by retaining at 1130° C. for 14 hours. Note that the cooling rate after the solution heat treatment was 180° C./minute.

Next, the sintered compact after the solution heat treatment was retained at 710° C. for four hours, and thereafter slowly cooled to 380° C. at a cooling rate of 1.2° C./minute. Moreover, as described in Table 2, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet. The composition of the magnet was confirmed by the ICP method similarly to other examples. The composition of the obtained magnet is as described in Table 1. Further, $D_{cell}$, $N_{max20}$, Cu concentration of Cu-rich phases, squareness ratio, coercive force, and residual magnetization of the magnet were measured similarly to other examples. Results thereof are described in Table 3.

Example 9 to Example 13

An alloy powder having the same composition as Example 8 was used as a material and press molded in a magnetic field, to thereby produce a compression-molded body. This compression-molded body was disposed in a chamber of a firing furnace, the chamber was evacuated until the degree of vacuum therein becomes $9.0 \times 10^{-3}$ Pa, and thereafter sintering and a solution heat treatment were performed by a method similarly to Example 8.

Further, as illustrated in Table 2, in Example 9, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 650° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

Further, as illustrated in Table 2, in Example 10, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 450° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

Further, as illustrated in Table 2, in Example 11, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for 12 hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

Further, as illustrated in Table 2, in Example 12, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for 16 hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

Further, as illustrated in Table 2, in Example 13, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for 6 hours as step S4. Thereafter, it was slowly cooled to 380° C. at a cooling rate of 0.25° C./minute as step S5, and retained at the reached temperature for one hour as step S6. Thereafter, it was furnace-cooled to room temperature as step S7, thereby obtaining a magnet.

The compositions of the respective magnets were confirmed by the ICP method similarly to other examples. The compositions of the respective magnets are as described in Table 1. Further, diameters of cell phases, $N_{max20}$, Cu concentration of Cu-rich phases, squareness ratios, coercive force, and residual magnetization of the magnets were measured similarly to other examples. Results thereof are described in Table 3.

Comparative Example 1, Comparative Example 2

Magnets having compositions described in Table 1 were produced by the same methods as Example 1 and Example 2, respectively. $D_{cell}$, $N_{max20}$, Cu concentration of Cu-rich phases, squareness ratios, coercive force, and residual magnetization of the magnets were measured similarly to other examples. Results thereof are described in Table 3.

Comparative Example 3 to Comparative Example 7

An alloy powder having the same composition as Example 8 was used as a material and press molded in a magnetic field, to thereby produce a compression-molded body. This compression-molded body was disposed in a chamber of a firing furnace, the chamber was evacuated until the degree of vacuum therein becomes $9.0 \times 10^{-3}$ Pa, and thereafter sintering and a solution heat treatment were performed by a method similarly to Example 8.

Further, as illustrated in Table 2, in Comparative Example 3, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 700° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

As illustrated in Table 2, in Comparative Example 4, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 400° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

As illustrated in Table 2, in Comparative Example 5, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for one hour as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

As illustrated in Table 2, in Comparative Example 6, the sintered compact after the solution heat treatment was retained at 710° C. for four hours, and thereafter slowly cooled to 380° C. at a cooling rate of 1.2° C./minute. Moreover, it was heated to 820° C. as step S1 of FIG. 2, and retained at 820° C. for 35 hours as step S2. Thereafter, it was slowly cooled to 600° C. at a cooling rate of 0.8° C./minute as step S3, and retained at the reached temperature for six hours as step S4. Thereafter, it was slowly cooled to 380° C. at a cooling rate of 1.5° C./minute as step S5, and retained at the reached temperature for one hour as step S6. Thereafter, it was furnace-cooled to room temperature as step S7, thereby obtaining a magnet.

As illustrated in Table 2, in Comparative Example 7, the sintered compact after the solution heat treatment was retained at 710° C. for four hours, and thereafter slowly cooled to 380° C. at a cooling rate of 1.2° C./minute. Moreover, it was heated to 845° C. as step S1 of FIG. 2, and retained at 845° C. for 35 hours as step S2. Thereafter, it was slowly cooled to 600° C. at a cooling rate of 0.8° C./minute as step S3, and retained at the reached temperature for six hours as step S4. Thereafter, it was slowly cooled to 380° C. at a cooling rate of 0.5° C./minute as step S5, and retained at the reached temperature for one hour as step S6. Thereafter, it was furnace-cooled to room temperature as step S7, thereby obtaining a magnet.

The compositions of the magnets were confirmed by the ICP method similarly to other examples. The compositions of the respective magnets are as described in Table 1. Further, $D_{cell}$, $N_{max20}$, Cu concentration of Cu-rich phases, squareness ratios, coercive force, and residual magnetization of the magnets were measured similarly to other examples. Results thereof are described in Table 3.

As is clear from Table 1 to Table 3, in the permanent magnets of Example 1 to Example 13, a good squareness ratio, high coercive force, and high magnetization are exerted owing to the high Cu concentration, small $D_{cell}$, and small $N_{max20}$ as compared to, for example, the permanent magnet of the Comparative Example 1 having an Sm concentration of 12.77% and the permanent magnet of the Comparative Example 2 having a Zr concentration of 4.70%. From this fact, it can be seen that the magnet characteristics can be increased by adjusting the amounts of the respective elements constituting the permanent magnets.

In the permanent magnets of Example 8 to Example 13, a good squareness ratio, high coercive force, and high magnetization are exerted owing to the high Cu concentration, small $D_{cell}$, and small $N_{max20}$ as compared to, for example, the permanent magnet of Comparative Example 6 in which the cooling rate in step S3 and step S5 is 1.5° C./sec. From this fact, it can be seen that the magnet characteristics can be increased by controlling the cooling rate during slow cooling in the aging treatment.

In the permanent magnets of Example 8 to Example 13, a good squareness ratio, high coercive force, and high magnetization are exerted owing to the high Cu concentration, small $D_{cell}$, and small $N_{max20}$ as compared to, for example, the permanent magnet of Comparative Example 4 in which the retention temperature in step S4 is 400° C. From this fact, it can be seen that the magnet characteristics can be increased by controlling the retention temperature during slow cooling in the aging treatment.

In the permanent magnets of Example 8 to Example 13, a good squareness ratio, high coercive force, and high magnetization are exerted owing to the high Cu concentration, small $D_{cell}$, and small $N_{max20}$ as compared to, for example, the permanent magnet of Comparative Example 5 in which the retention time in step S4 is one hour. From this fact, it can be seen that the magnet characteristics can be increased by controlling the retention time during slow cooling in the aging treatment.

As described above, in the permanent magnets of Example 1 to Example 13, a good squareness ratio, high coercive force, and high magnetization are exerted in all of them even when the Fe concentration is 23% or more, by controlling the sizes and dispersion of the diameters of the cell phases. From this fact, it can be seen that the permanent magnets of Example 1 to Example 13 are excellent in magnet characteristics.

TABLE 1

MAGNET COMPOSITION (ATOMIC RATIO)
((Others) Example 1: Nd, Example 2: Ti, Example 3: Mn, Example 4: Cr, Example 5: Al_0.0115 + Cr_0.015, Comparative Example 1: Cr, Comparative Example 2: Ti)

|  | Sm | Co | Fe | Cu | Zr | Others |
|---|---|---|---|---|---|---|
| Example 1 | 11.04 | 56.36 | 23.97 | 5.33 | 3.11 | 0.19 |
| Example 2 | 12.05 | 54.15 | 26.21 | 5.72 | 1.61 | 0.26 |
| Example 3 | 10.81 | 52.67 | 29.43 | 5.26 | 1.47 | 0.36 |
| Example 4 | 11.30 | 53.00 | 29.54 | 4.26 | 1.77 | 0.13 |
| Example 5 | 11.05 | 49.53 | 28.46 | 9.34 | 1.51 | 0.11 |
| Example 6 | 11.24 | 50.06 | 31.87 | 5.23 | 1.60 | 0 |
| Example 7 | 11.49 | 48.06 | 33.63 | 5.23 | 1.59 | 0 |
| Example 8 | 11.36 | 50.74 | 30.94 | 5.32 | 1.64 | 0 |
| Example 9 | 11.36 | 50.74 | 30.94 | 5.32 | 1.64 | 0 |
| Example 10 | 11.36 | 50.74 | 30.94 | 5.32 | 1.64 | 0 |
| Example 11 | 11.36 | 50.74 | 30.94 | 5.32 | 1.64 | 0 |
| Example 12 | 11.36 | 50.74 | 30.94 | 5.32 | 1.64 | 0 |
| Example 13 | 11.36 | 50.74 | 30.94 | 5.32 | 1.64 | 0 |
| Comparative Example 1 | 12.77 | 55.25 | 23.49 | 5.22 | 3.05 | 0.22 |
| Comparative Example 2 | 12.05 | 51.63 | 26.21 | 5.72 | 4.13 | 0.26 |
| Comparative Example 3 | 11.36 | 50.74 | 30.94 | 5.32 | 1.64 | 0 |
| Comparative Example 4 | 11.36 | 50.74 | 30.94 | 5.32 | 1.64 | 0 |
| Comparative Example 5 | 11.36 | 50.74 | 30.94 | 5.32 | 1.64 | 0 |
| Comparative Example 6 | 11.36 | 50.74 | 30.94 | 5.32 | 1.64 | 0 |
| Comparative Example 7 | 11.36 | 50.74 | 30.94 | 5.32 | 1.64 | 0 |

TABLE 2

|  | S2 Retention Temperature (° C.) | S2 Retention Time (hour) | S3 Cooling Rate (° C./min) | S4 Retention Temperature (° C.) | S4 Retention Time (hour) | S5 Cooling Rate (° C./min) |
|---|---|---|---|---|---|---|
| Example 1 | 830 | 30 | 0.9 | 600 | 8 | 0.9 |
| Example 2 | 830 | 30 | 0.9 | 600 | 8 | 0.9 |
| Example 3 | 800 | 55 | 0.9 | 450 | 4 | 0.45 |
| Example 4 | 800 | 55 | 0.9 | 450 | 4 | 0.45 |
| Example 5 | 800 | 55 | 0.9 | 450 | 4 | 0.45 |
| Example 6 | 815 | 45 | 0.6 | 500 | 10 | 0.5 |
| Example 7 | 815 | 45 | 0.6 | 500 | 10 | 0.5 |
| Example 8 | 820 | 35 | 0.8 | 600 | 6 | 0.5 |
| Example 9 | 820 | 35 | 0.8 | 650 | 6 | 0.5 |
| Example 10 | 820 | 35 | 0.8 | 450 | 6 | 0.5 |
| Example 11 | 820 | 35 | 0.8 | 600 | 12 | 0.5 |
| Example 12 | 820 | 35 | 0.8 | 600 | 16 | 0.5 |
| Example 13 | 820 | 35 | 0.8 | 600 | 6 | 0.25 |
| Comparative Example 1 | 830 | 30 | 0.9 | 600 | 8 | 0.9 |
| Comparative Example 2 | 830 | 30 | 0.9 | 600 | 8 | 0.9 |
| Comparative Example 3 | 820 | 35 | 0.8 | 700 | 6 | 0.5 |
| Comparative Example 4 | 820 | 35 | 0.8 | 400 | 6 | 0.5 |
| Comparative Example 5 | 820 | 35 | 0.8 | 600 | 1 | 0.5 |
| Comparative Example 6 | 820 | 35 | 1.5 | 600 | 6 | 1.5 |
| Comparative Example 7 | 845 | 35 | 0.8 | 600 | 6 | 0.5 |

TABLE 3

|  | $D_{cell}$ (nm) | $N_{max20}$ | Cu Concentration of Cu-Rich Phases (atomic %) | Squareness Ratio (%) | Coercive Force (kA/m) | Residual Magnetization (T) |
|---|---|---|---|---|---|---|
| Example 1 | 215 | 15 | 35 | 95.0 | 1580 | 1.150 |
| Example 2 | 200 | 18 | 40 | 94.5 | 1500 | 1.185 |

TABLE 3-continued

|  | $D_{cell}$ (nm) | $N_{max20}$ | Cu Concentration of Cu-Rich Phases (atomic %) | Squareness Ratio (%) | Coercive Force (kA/m) | Residual Magnetization (T) |
| --- | --- | --- | --- | --- | --- | --- |
| Example 3 | 210 | 14 | 49 | 93.0 | 1350 | 1.210 |
| Example 4 | 195 | 15 | 47 | 92.0 | 1400 | 1.215 |
| Example 5 | 200 | 10 | 55 | 92.5 | 1430 | 1.200 |
| Example 6 | 210 | 8 | 42 | 92.5 | 1260 | 1.250 |
| Example 7 | 220 | 8 | 45 | 91.5 | 1090 | 1.265 |
| Example 8 | 205 | 10 | 36 | 93.5 | 1480 | 1.245 |
| Example 9 | 220 | 17 | 45 | 92.0 | 1530 | 1.245 |
| Example 10 | 210 | 15 | 42 | 91.5 | 1460 | 1.235 |
| Example 11 | 190 | 7 | 50 | 94.0 | 1560 | 1.245 |
| Example 12 | 180 | 4 | 54 | 94.5 | 1600 | 1.245 |
| Example 13 | 195 | 8 | 63 | 94.5 | 1660 | 1.245 |
| Comparative Example 1 | 380 | 24 | 25 | 70.5 | 220 | 1.130 |
| Comparative Example 2 | 300 | 28 | 38 | 78.0 | 340 | 1.155 |
| Comparative Example 3 | 315 | 31 | 37 | 85.5 | 1350 | 1.230 |
| Comparative Example 4 | 260 | 25 | 30 | 87.0 | 1280 | 1.200 |
| Comparative Example 5 | 235 | 29 | 35 | 85.0 | 600 | 1.220 |
| Comparative Example 6 | 250 | 38 | 20 | 82.0 | 300 | 1.220 |
| Comparative Example 7 | 240 | 17 | 40 | 80.0 | 135 | 1.235 |

What is claimed is:

1. A permanent magnet, comprising:

a composition expressed by a composition formula:

$$R_pFe_qM_rCu_tCo_{100-p-q-r-t}$$

where R is at least one element selected from the group consisting of rare earth elements, M is at least one element selected from the group consisting of Zr, Ti, and Hf, p is a number satisfying $10.5 \leq p \leq 12.5$ atomic %, q is a number satisfying $26 \leq q \leq 29.4$ atomic %, r is a number satisfying $0.88 \leq r \leq 4.5$ atomic %, and t is a number satisfying $5.23 \leq t \leq 10.7$ atomic %, and a total of p, q and r is 41.02 atomic % or less; and a metallic structure including cell phases having a $Th_2Zn_{17}$ crystal phase and Cu-rich phases having higher Cu concentration than the cell phases, an average diameter of the cell phases being 220 nm or less, the cell phases having diameter of a numeric value range from a minimum diameter to a maximum diameter, a ratio of a number of cell phases having diameters in a numeric value range of upper 20% from the maximum diameter being 20% or less of all the cell phases, a squareness ratio of the magnet being 93.5% or more and 94.5% or less, and a residual magnetization of the magnet being 1.185 T or more and 1.215 T or less.

2. The magnet of claim 1, wherein the Cu-rich phases are provided to surround the cell phases.

3. The magnet of claim 1, wherein the Cu-rich phases have a $CaCu_5$ crystal phase.

4. The magnet of claim 1, wherein the Cu concentration of the Cu-rich phases is 45 atomic % or more.

5. The magnet of claim 1, wherein a full width at half maximum of a concentration profile of Cu in the Cu-rich phases is 5 nm or less.

6. The magnet of claim 1, wherein 50 atomic % or more of a total amount of the element R in the composition formula is Sm, and wherein 50 atomic % or more of the element M in the composition formula is Zr.

7. The magnet of claim 1, wherein r is a number satisfying $0.88 \leq r \leq 3.11$ atomic %.

8. A motor comprising the permanent magnet of claim 1.

9. A generator comprising the permanent magnet of claim 1.

10. A vehicle comprising the motor of claim 8.

11. A vehicle comprising the generator of claim 9.

12. A permanent magnet, comprising:

a composition expressed by a composition formula:

$$R_pFe_qM_rCu_t(Co_{100-x}A_x)_{100-p-q-r-t}$$

where R is at least one element selected from the group consisting of rare earth elements, M is at least one element selected from the group consisting of Zr, Ti, and Hf, A is at least one element selected from the group consisting of Ni, V, Cr, Mn, Al, Ga, Nb, Ta, and W, p is a number satisfying $10.5 \leq p \leq 12.5$ atomic %, q is a number satisfying $26 \leq q \leq 29.4$ atomic %, r is a number satisfying $0.88 \leq r \leq 4.5$ atomic %, t is a number satisfying $5.23 \leq t \leq 10.7$ atomic %, x is a number satisfying $x \leq 20$ atomic %, and a total of p, q and r is 41.02 atomic % or less; and a metallic structure including cell phases having a $Th_2Zn_{17}$ crystal phase and Cu-rich phases having higher Cu concentration than the cell phases, an average diameter of the cell phases being 220 nm or less, the cell phases having diameter of a numeric value range from a minimum diameter to a maximum diameter, a ratio of a number of cell phases having diameters in a numeric value range of upper 20% from the maximum diameter being 20% or less of all the cell phases, a squareness ratio of the magnet being 93.5% or more and 94.5% or less, and a residual magnetization of the magnet being 1.185 T or more and 1.215 T or less.

13. A permanent magnet, comprising:

a composition expressed by a composition formula:

$$R_pFe_qM_rCu_tCo_{100-p-q-r-t}$$

where R is at least one element selected from the group consisting of rare earth elements, M is at least one element selected from the group consisting of Zr, Ti, and Hf, p is a number satisfying $10.5 \leq p \leq 12.5$ atomic %, q is a number satisfying $26 \leq q \leq 40$ atomic %, r is a number satisfying $0.88 \leq r \leq 4.5$ atomic %, and t is a number satisfying $5.23 \leq t \leq 10.7$ atomic %; and a metallic structure including cell phases having a $Th_2Zn_{17}$ crystal phase and Cu-rich phases having higher Cu concentration than the cell phases,
an average diameter of the cell phases being 220 nm or less,
the cell phases having diameter of a numeric value range from a minimum diameter to a maximum diameter, a ratio of a number of cell phases having diameters in a numeric value range of upper 20% from the maximum diameter being 20% or less of all the cell phases,
a squareness ratio of the magnet being 93.5% or more and 94.5% or less, and
a residual magnetization of the magnet being 1.185 T or more and 1.215 T or less.

* * * * *